United States Patent
Lee

(10) Patent No.: US 7,888,819 B2
(45) Date of Patent: Feb. 15, 2011

(54) MULTI-INPUT POWER CONVERTER AND UNINTERRUPTIBLE POWER SUPPLY HAVING THE SAME

(75) Inventor: Cheng-Tan Lee, Taipei (TW)

(73) Assignee: Phoenixtec Power Co., Ltd., Taipei (TW)

( * ) Notice: Subject to any disclaimer, the term of this patent is extended or adjusted under 35 U.S.C. 154(b) by 251 days.

(21) Appl. No.: 12/148,847

(22) Filed: Apr. 23, 2008

(65) Prior Publication Data

US 2009/0267417 A1    Oct. 29, 2009

(51) Int. Cl.
H02J 9/00 (2006.01)

(52) U.S. Cl. .................. 307/65; 307/72; 307/73; 307/75; 363/67; 363/68; 363/125; 363/127; 363/131; 318/105; 318/106; 318/107

(58) Field of Classification Search .............. 307/65, 307/72, 73, 75; 363/67, 68
See application file for complete search history.

(56) References Cited

U.S. PATENT DOCUMENTS

| | | | | |
|---|---|---|---|---|
| 5,574,636 A | * | 11/1996 | Lee et al. | 363/132 |
| 5,625,549 A | * | 4/1997 | Horvat | 363/132 |
| 5,936,855 A | * | 8/1999 | Salmon | 363/46 |
| 6,067,243 A | * | 5/2000 | Suzuki et al. | 363/132 |
| 6,084,382 A | * | 7/2000 | Hite | 320/116 |
| 6,483,730 B2 | * | 11/2002 | Johnson, Jr. | 363/123 |
| 6,628,013 B2 | * | 9/2003 | Vogman | 307/85 |
| 6,960,843 B2 | * | 11/2005 | Yamamoto | 307/86 |
| 7,105,949 B2 | * | 9/2006 | Wang et al. | 307/51 |
| 7,199,535 B2 | * | 4/2007 | Welchko et al. | 318/105 |
| 7,433,212 B2 | * | 10/2008 | Igarashi et al. | 363/37 |
| 2005/0213357 A1 | * | 9/2005 | Paatero | 363/95 |
| 2006/0164875 A1 | * | 7/2006 | Colombi et al. | 363/125 |
| 2008/0012426 A1 | * | 1/2008 | Lu et al. | 307/65 |
| 2008/0304296 A1 | * | 12/2008 | NadimpalliRaju et al. | 363/45 |

* cited by examiner

Primary Examiner—Jared J Fureman
Assistant Examiner—Justen Fauth
(74) Attorney, Agent, or Firm—William E. Pelton, Esq.; Cooper & Dunham LLP

(57) ABSTRACT

An uninterruptible power supply has first and second input terminals, first and second inductors, first and second AC switch units, first and second storing devices and a control unit. The first and the second inductors are electrically connected to the first and the second input terminals. The first and the second AC switch units are electrically connected to the first and the second inductors for conducting input currents. The control unit is electrically connected to the first and the second AC switch units which may be turned on and off thereby to control the first and the second inductors which charge the input currents and discharge the input currents to the first and the second storing devices.

11 Claims, 13 Drawing Sheets

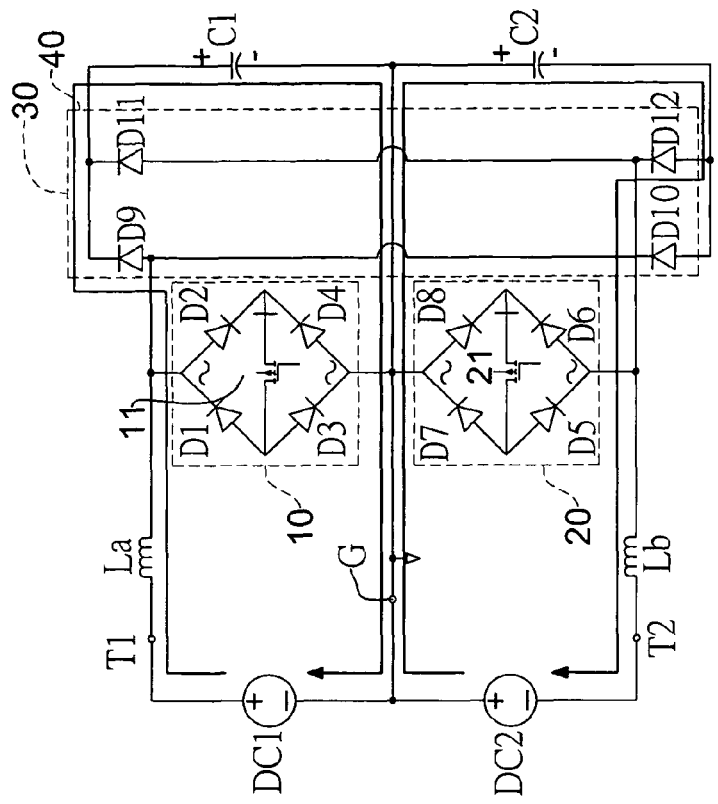
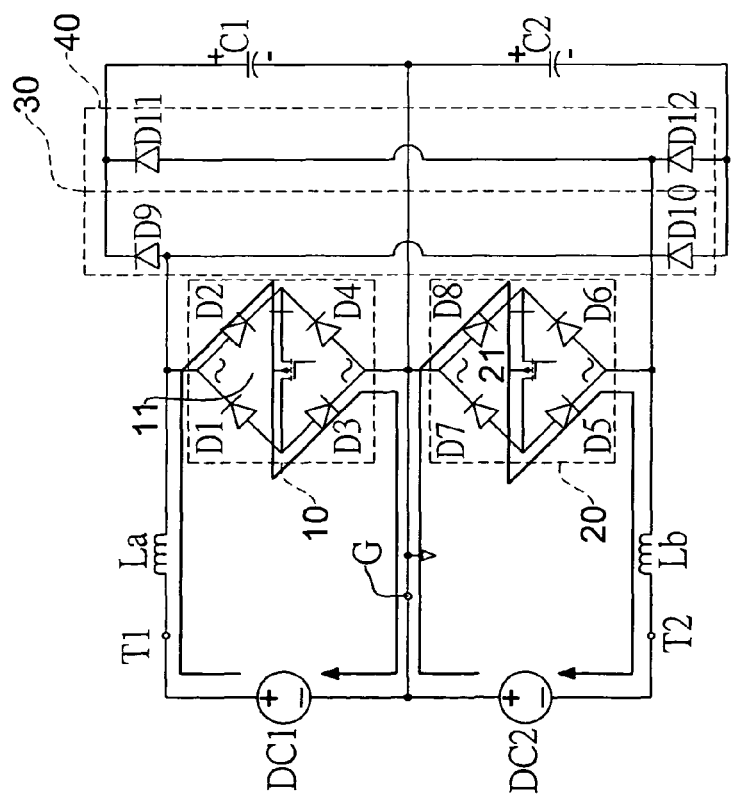
FIG. 3A
FIG. 3B

MULTI-INPUT POWER CONVERTER AND UNINTERRUPTIBLE POWER SUPPLY HAVING THE SAME

BACKGROUND OF THE INVENTION

1. Field of the Invention

The present invention relates to a multi-input power converter and an uninterruptible power supply (UPS) having the same, and more particularly to a multi-input power converter that is constructed by multiple AC switches and raises the density of the input power, and an UPS having the multi-input power converter.

2. Description of Related Art

With reference to FIG. 10, which shows a conventional uninterruptible power supply (UPS) according to the prior art, comprises a power factor correction (PFC) and AC to DC converter (102), a DC to DC converter (104), a battery (105), a DC to AC inverter (106), an output filtering device (107) and a switch (103), wherein the switch (103) is electrically connected between the PFC and AC to DC converter (102) and the DC to DC converter (104). The switch (103) is turned off when utility power (101) is available, so the DC to DC converter (104) does not work. At this moment, the conventional UPS operates in so-called line mode. When the conventional UPS operates in the line mode, the PFC and AC to DC converter (102) converts the AC utility power (101) into DC power and outputs the DC power to the DC to AC converter (106) and the output filter (107) to convert the DC power into an AC output power. The AC output power is then provided to a load. On the contrary, when the utility power (101) fails, the switch (103) is turned on and the conventional UPS operates in so-called battery mode. When the conventional UPS operates in the battery mode, the battery (105) outputs DC power to the DC to DC converter (104). The DC to DC converter (104) raises voltage level of the DC power and outputs the raised voltage level DC power to the DC to AC converter (106) and the output filter device (107) to convert the DC power into an AC output power. The AC output power is then provided to the load. Therefore, the conventional UPS provides a continuous supply of electric power to the load. Furthermore, the conventional UPS further has a bypass output path (108) for protecting the conventional UPS.

However, in order to separate the line mode and the battery mode of the conventional UPS, the PFC and AC to DC converter (102) and the DC to DC converter (104) have to be disposed separately in the conventional UPS. Therefore, the cost of designing circuit of the conventional UPS is higher but the density of the power is lower.

To save the foregoing designing cost, some manufacturers designed an AC to DC and DC to DC converter that incorporates the AC to DC converter and the DC to DC converter. With reference to FIG. 11, the AC to DC and DC to DC converter (110) is electrically connected to a two-phase 3-wire input power supply and comprises four inductors (L11, L12, L21, L22), four semiconductor switches (S11, S12, S21, S22), four rectifying diodes (D111, D211, D121, D221) and two storing devices (C1, C2). When incorporating the AC to DC and DC to DC converter (110) in the conventional UPS, the UPS operates the AC to DC converting and DC to DC converting functions depending on what mode the UPS operates to control the semiconductor switches (S11, S12, S21, S22) on or off. Furthermore, the AC to DC and DC to DC converter may comprise six inductors, six semiconductor switches, six rectifying diodes and two storing capacitors when the AC to DC and DC to DC converter is electrically connected to a three-phase 4-wire input power supply.

However, such a AC to DC and DC to DC converter still requires using many semiconductor switches, and each semiconductor switch requires electrically connecting to an isolating driving circuit that controls the connected semiconductor switch. Therefore, how to reduce the amount of the semiconductor switches is a critical problem for the UPS manufacturers.

To overcome the shortcomings, the present invention provides a multi-input power converter and an UPS having the same to mitigate or obviate the aforementioned problems.

SUMMARY OF THE INVENTION

The main objective of the invention is to provide a multi-input power converter. The multi-input power converter in accordance with the present invention comprises input connection means having a first input terminal, a second input terminal and a reference ground terminal, inductor means having a first inductor and a second inductor, switch means having a first AC switch unit and a second AC switch unit, rectifier means having a first rectifier and a second rectifier, output storing means having a first storing device and a second storing device and switch control means having a control unit. The inductor means is electrically connected to the input connection means. The switch means is electrically connected to the inductor means for conducting input currents. The switch control means is electrically connected to the switch means to control the inductor means charging the input currents and discharging the input currents to the output storing means to perform the DC to DC converting, AC to DC converting and power factor correction functions by controlling the switch means turning on and off.

Another main objective of the invention is to provide an uninterruptible power supply (UPS) having the foregoing multi-input power converter and further comprises two batteries, two DC switches, an DC to AC inverter and an output filtering device. The batteries are electrically connected together at the reference ground terminal and are electrically connected respectively to the input terminals. The DC switches are electrically connected respectively between the two batteries and the input terminals. The DC to AC inverter is electrically connected to the storing devices. The output filtering device is electrically connected to the DC to AC inverter.

The other main objective of the invention is to provide an UPS having the foregoing multi-input power converter and further comprises a battery, an DC switch, an DC to AC inverter and an output filtering device. The battery and the DC switch are electrically connected in series and are electrically connected respectively to the input terminals. The DC to AC inverter is electrically connected to the storing devices. The output filtering device is electrically connected to the DC to AC inverter.

Other objectives, advantages and novel features of the invention will become more apparent from the following detailed description when taken in conjunction with the accompanying drawings.

BRIEF DESCRIPTION OF THE DRAWINGS

FIG. 3A is a circuit diagram of the multi-input power converter in FIG. 1 that shows the current routes when the multi-input power converter is electrically connected to two DC power supplies and stores DC electric power in the first and the second inductors;

FIG. 3B is a circuit diagram of the multi-input power converter in FIG. 1 that shows the current routes when the multi-input power converter is electrically connected to two DC power supplies and releases DC electric power stored in the first and the second inductors to the first and the second storing devices;

DETAILED DESCRIPTION OF PREFERRED EMBODIMENT

Figure 1:
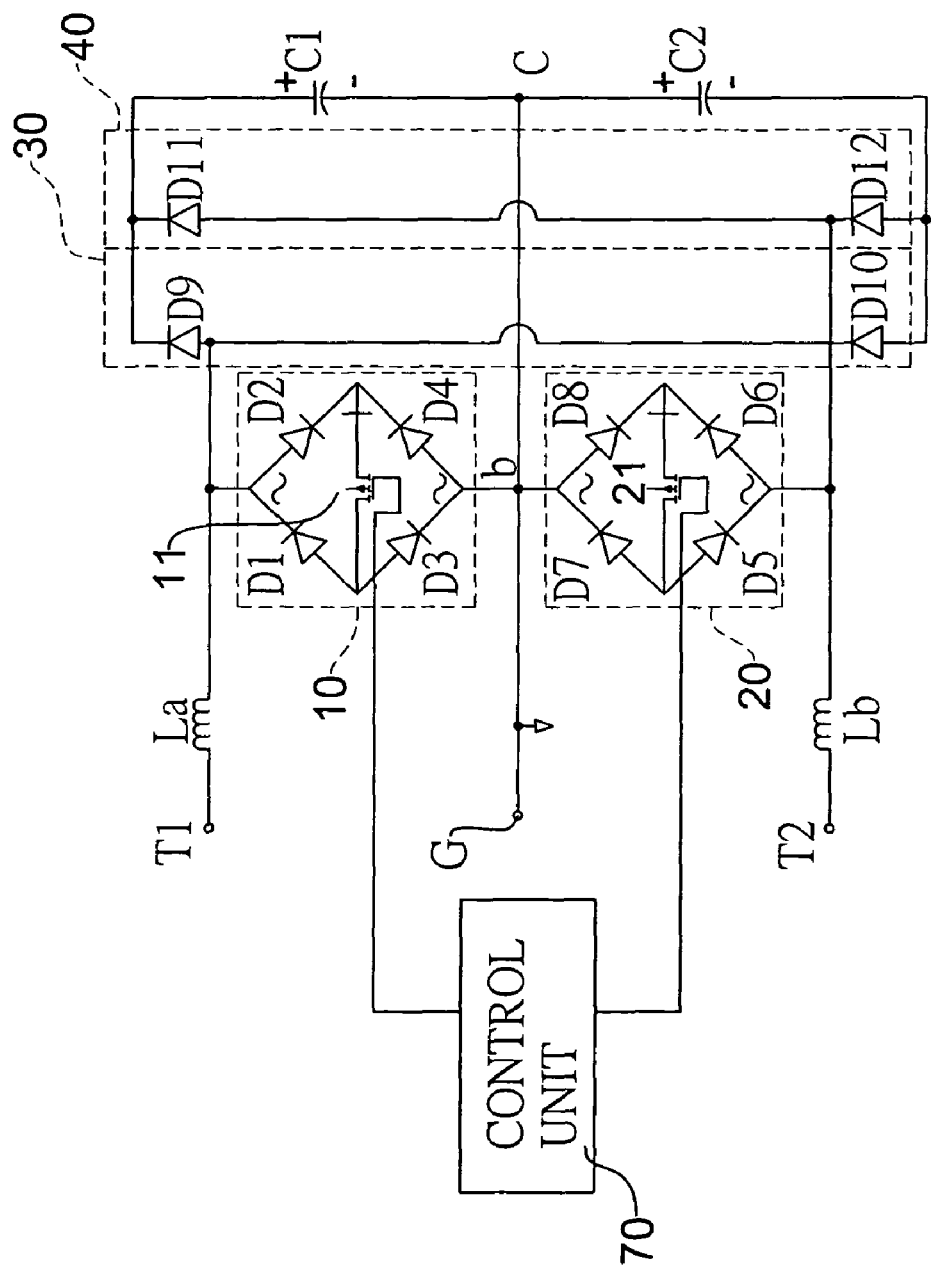
FIG. 1 is a circuit diagram of a first embodiment of a multi-input power converter in accordance with the present invention.

With reference to FIG. 1, a first embodiment of a multi-input power converter in accordance with the present invention comprises input connection means having a first input terminal (T1), a second input terminal (T2) and a reference ground terminal (G) for electrically connecting to an input power system and receiving input currents from the input power system, inductor means having a first inductor (La) and a second inductor (Lb) electrically connected to the first and second input terminals (T1, T2) of the input connection means for charging and discharging the input currents, switch means having a first AC switch unit (10) and a second AC switch unit (20) electrically connected to the inductor means for conducting the input currents, rectifier means having a first rectifier (30) and a second rectifier (40) electrically connected to the inductor means and the switch means for receiving discharged input currents from the inductor means and producing rectified inductor currents when the input current is discharged from the inductor means, output storing means having a first storing device (C1) and a second storing device (C2) electrically connected to the rectifier means for receiving the rectified inductor currents and charging voltages when the inductor means is discharged and switch control means having a control unit (70) electrically connected to the first and the second AC switch units of the switch means to control the inductor means charging the input currents and discharging input current to the output storing means by controlling the first and the second AC switch units turning on and turning off.

The reference ground terminal (G) is for electrically connecting to a reference ground.

The first and second inductors (La, Lb) are electrically connected respectively to the first and second input terminals (T1, T2) and store and release electric power input respectively from the first and second input terminals (T1, T2), and each inductor (La, Lb) has a first end and a second end. The first ends of the first and second inductors (La, Lb) are electrically connected respectively to the first and second input terminals (T1, T2).

The first AC switch unit (10) is electrically connected to the first inductor (La), has a first end and a second end and may comprise a first diode bridge circuit and a first switch (11). The first end of the first AC switch unit (10) is electrically connected to the second end of the first inductor (La). The second end of the first AC switch unit (10) is electrically connected to the reference ground terminal (G). The first diode bridge circuit comprises a first, a second, a third and a fourth diodes (D1, D2, D3, D4). Each diode (D1, D2, D3, D4) has two electrodes that form a cathode and an anode. The cathode of the first diode (D1) and the anode of the second diode (D2) are electrically connected at the first end of the first AC switch unit (10). The anode of the third diode (D3) is electrically connected to the anode of the first diode (D1) at a first node. The cathode of the fourth diode (D4) is electrically connected to the cathode of the second diode (D2) at a second node. The anode of the fourth diode (D4) is electrically connected to the cathode of the third diode (D3) at the second end of the first AC switch unit (10). The first switch (11) is electrically connected between the first node and the second node and may be a semiconductor switch.

The second AC switch unit (20) is electrically connected to the second inductor (Lb), has a first end and a second end and may comprise a second diode bridge circuit and a second switch (21). The first end of the second AC switch unit (20) is electrically connected to the second end of the second storing inductor (Lb). The second end of the second AC switch unit (20) is electrically connected to the reference ground terminal (G). The second diode bridge circuit comprises a fifth, a sixth, a seventh and a eighth diodes (D5, D6, D7, D8). Each diode (D5, D6, D7, D8) has two electrodes that form a cathode and an anode. The cathode of the fifth diode (D5) is electrically connected to the anode terminal of the sixth diode (D6) at the first end of the second AC switch unit (20). The anode terminal of the seventh diode (D7) is electrically connected to the anode terminal of the fifth diode (D5) at a third node. The cathode of the eighth diode (D8) is electrically connected to the cathode of the sixth diode (D6) at a fourth node. The anode of the eighth diode (D8) is electrically connected to the cathode of the seventh diode (D7) at the second end of the second AC switch unit (20). The second switch (21) is electrically connected between the third node and the fourth node and may be a semiconductor switch.

The first rectifier (30) is electrically connected to the first end of the first AC switch unit (10) and the second end of the first inductor (La) and may comprise a ninth and a tenth diodes (D9, D10) electrically connected in series. Each diode (D9, D10) comprises two electrodes that form a cathode and an anode. The cathode of the tenth diode (D10) is electrically connected to the anode of the ninth diode (D9), the first end of the first AC switch unit (10) and the second end of the first inductor (La).

The second rectifier (40) is electrically connected to the first end of the second AC switch unit (20) and the second end of the second inductor (Lb) and may comprise an eleventh and a twelfth diodes (D11, D12) electrically connected in series. Each diode (D11, D12) comprises two electrodes that form a cathode and an anode. The cathode of the twelfth diode (D12) is electrically connected to the anode of the eleventh diode (D11), the first end of the second AC switch unit (20) and the second end of the second inductor (Lb). The cathode of the eleventh diode (D11) is electrically connected to the cathode of the ninth diode (D9). The anode of the twelfth diode (D12) is electrically connected to the anode of the tenth diode (D10).

The first storing device (C1) is electrically connected to the first ends of the first and the second AC switch units (10, 20) respectively through the first and the second rectifiers (30, 40), has a positive terminal and a negative terminal and may be a capacitor. The positive terminal of the first storing device (C1) is electrically connected to the first and the second diodes (D1, D2) in the first AC switch unit (10) and the fifth and the sixth diodes (D5, D6) in the second AC switch unit (20) respectively through the ninth diode (D9) in the first rectifier (30) and the eleventh diodes (D11) in the second rectifier (40). The negative terminal of the first storing device (C1) is electrically connected to the reference ground terminal (G).

The second storing device (C2) is electrically connected to the first ends of the first and the second AC switch units (10, 20) respectively through the first and the second rectifiers (30, 40), has a positive terminal and a negative terminal and may be a capacitor. The positive terminal of the second storing device (C2) is electrically connected to the negative terminal of the first storing device (C1), the reference ground terminal (G) and the second ends of the first and the second AC switch units (10, 20). The negative terminal of the second storing device (C2) is electrically connected to the first and the second diodes (D1, D2) in the first AC switch unit (10) and the fifth and the sixth diodes (D5, D6) in the second AC switch unit (20) respectively through the tenth diode (D10) in the first rectifier (30) and the twelfth diode (D12) in the second rectifier (40).

The control unit (70) is electrically connected to the first and the second switch (11, 12) respectively in the first and the second AC switch units (10, 20), controls the first and the second inductors (La, Lb) storing electric power and releasing stored electric power to the first and the second storing devices (C1, C2) by controlling the first and the second switch (11, 12) in the first and the second AC switch units (10, 20) respectively turning on and turning off and may have an AC to DC converting process, a power factor correction (PFC) process and a DC to DC converting process.

Figure 2A:
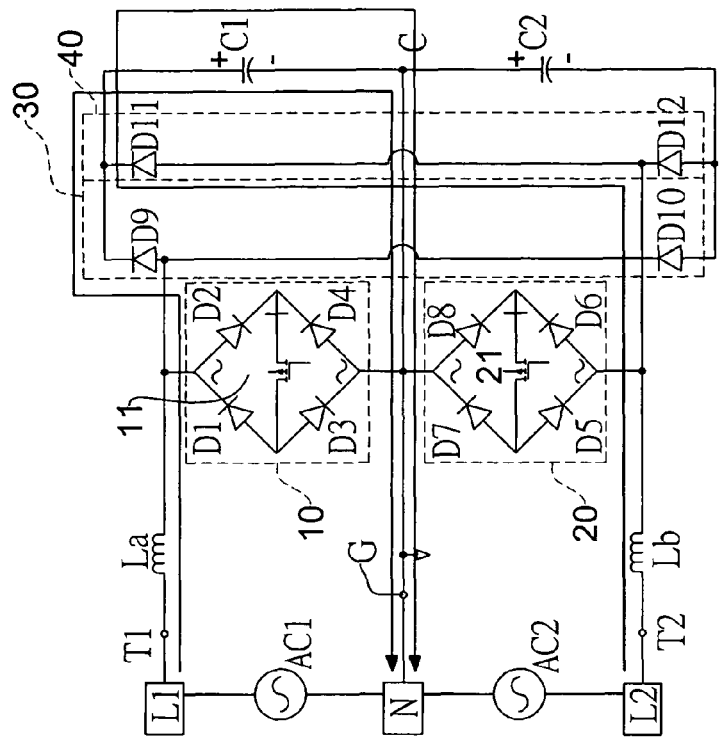
FIG. 2A is a circuit diagram of the multi-input power converter in FIG. 1 that shows the current routes when the multi-input power converter is electrically connected to two AC power supplies and stores electric power in a first and a second inductors during the positive half cycle of the two AC power supplies.

With further reference to FIGS. 2A to 2D, when the first embodiment of the multi-input power converter in accordance with the present invention is electrically connected to a two-phase 3-wire AC power supply comprising a first AC power supply (AC1) and a second AC power supply (AC2), the first and the second input terminals (T1, T2) are electrically connected respectively to line wires (L1, L2) of the first AC power supply (AC1) and the second AC power supply (AC2), and the reference ground terminal (G) is electrically connected to a neutral wire (N) of the two-phase 3-wire AC power supply. Furthermore, the AC to DC converting process may comprise steps of:

1. With reference to FIG. 2A, when the first or the second AC power supplies (AC1, AC2) is in positive half cycle, the control unit (70) controls the first and the second switches (11, 21) in the first and the second AC switch units (10, 20) respectively turning on to store electric power in positive half cycle in the first and the second inductors (La, Lb). When the first switch (11) of the first AC switch unit (10) is turned on, the current from the line wire (L1) of the first AC power supply (AC1) will flow through the first inductor (La), the second and the third diodes (D2, D3) in the first AC switch unit (10) and the reference ground terminal (G) and back to the neutral wire (N) of the two-phase 3-wire power supply in sequence. When the second switch (21) of the second AC switch unit (20) is turned on, the current from the line wire (L2) of the second AC power supply (AC1) will flow through the second inductor (Lb), the sixth and the seventh diodes (D6, D7) in the second AC switch unit (20) and the reference ground terminal (G) and back to the neutral wire (N) of the two-phase 3-wire power supply in sequence.

Figure 2B:
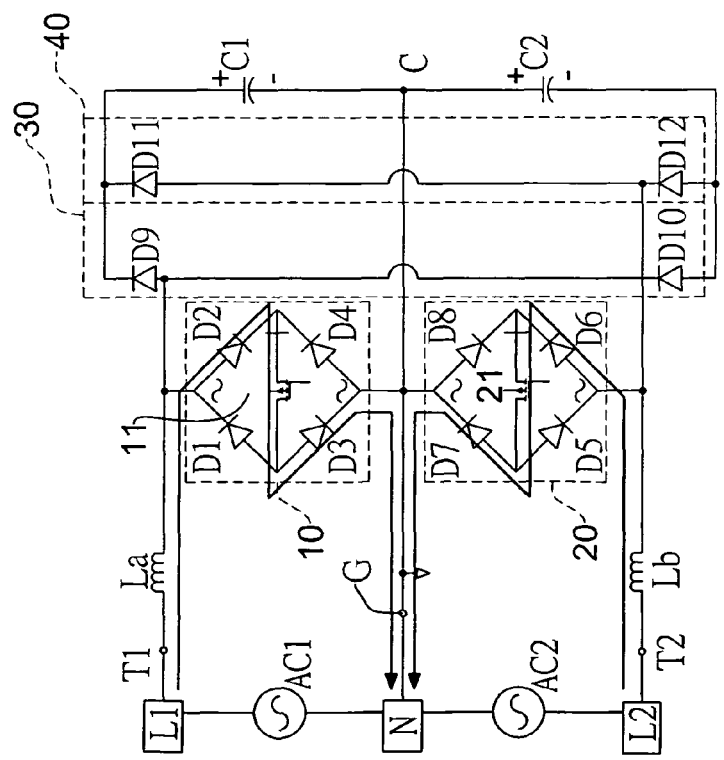
FIG. 2B is a circuit diagram of the multi-input power converter in FIG. 1 that shows the current routes when the multi-input power converter is electrically connected to two AC power supplies and releases the electric power stored in the first and the second inductors to a first storing device during the positive half cycle of the two AC power supplies.

2. With reference to FIG. 2B, the control unit (70) controls the first and the second switches (11, 21) in the first and the second AC switch units (10, 20) turning off to allow the first and the second inductors (La, Lb) to release stored electric power in positive half cycle to the first storing device (C1).

Figure 2D:
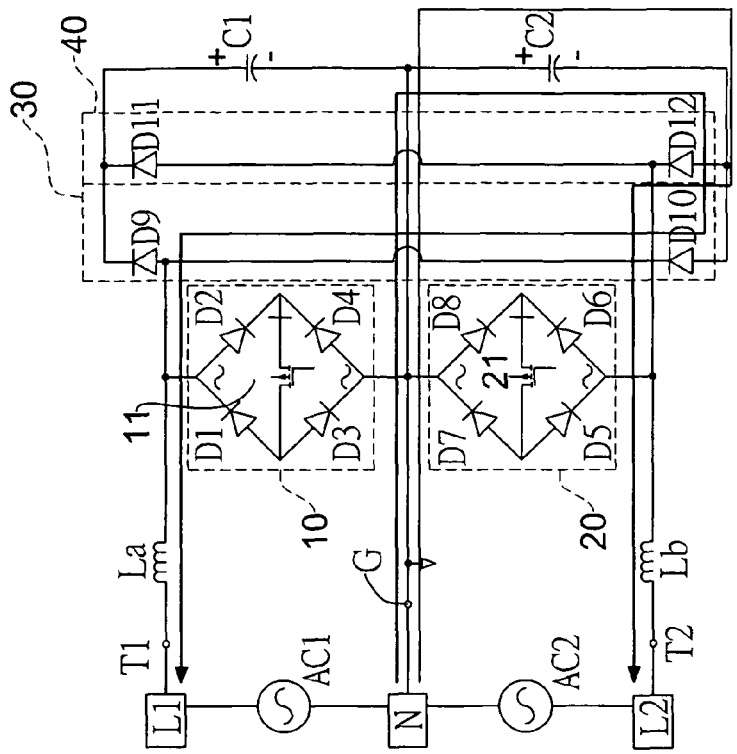
FIG. 2D is a circuit diagram of the multi-input power converter in FIG. 1 that shows the current routes when the multi-input power converter is electrically connected to two AC power supplies and releases the electric power stored in the first and the second inductors to a second storing device during the negative half cycle of the two AC power supplies.
Figure 2C:
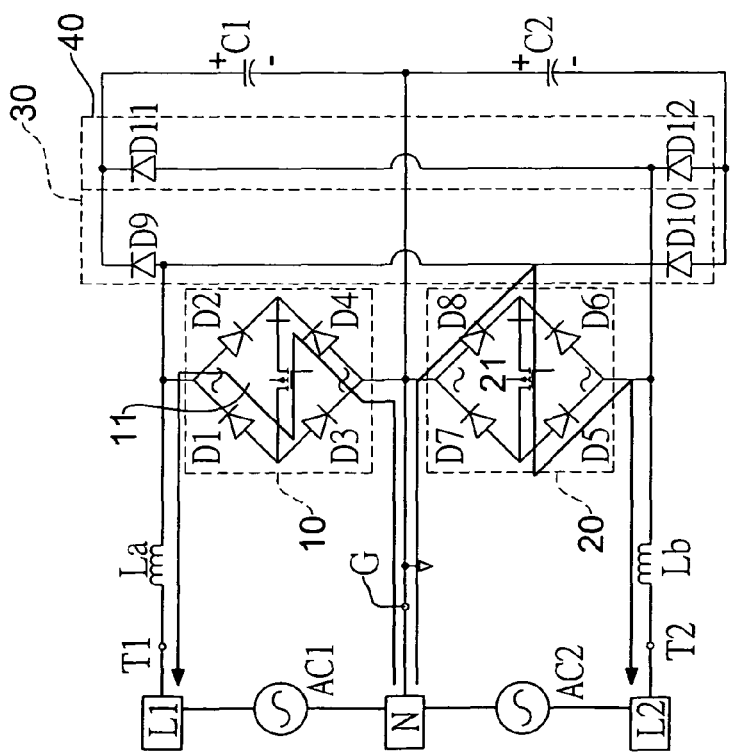
FIG. 2C is a circuit diagram of the multi-input power converter in FIG. 1 that shows the current routes when the multi-input power converter is electrically connected to two AC power supplies and stores electric power in the first and the second inductors during the negative half cycle of the two AC power supplies.

3. With reference to FIG. 2C, when the first or the second AC power supplies (AC1, AC2) is in negative half cycle, the control unit (70) controls the first and the second switches (11, 21) in the first and the second AC switch units (10, 20) respectively turning on to store electric power in negative half cycle in the first and the second inductors (La, Lb). When the first switch (11) of the first AC switch unit (10) is turned on, the current from the neutral wire (N) of the two-phase 3-wire power supply will flow through the reference ground terminal (G), the fourth and the first diodes (D4, D1) in the first AC switch unit (10) and the first inductor (La) and back to the line wire (L1) of the first AC power supply (AC1) in sequence. When the second switch (21) of the second AC switch unit (20) is turned on, the current from the neutral wire (N) of the two-phase 3-wire power supply will flow through the reference ground terminal (G), the eighth and the fifth diodes (D8, D5) in the second AC switch unit (20) and the second inductor (Lb) and back to the line wire (L2) of the second AC power supply (AC1) in sequence.

4. With reference to FIG. 2D, the control unit (70) controls the first and the second switches (11, 21) in the first and the second AC switch units (10, 20) turning off to allow the first and the second inductors (La, Lb) to release stored electric power in negative half cycle to the second storing device (C2).

Furthermore, the PFC process allows the control unit (70) to control the first and the second AC switch units (10, 20) turning on or off based respectively on input voltages of the connected first and second AC power supplies (AC1, AC2) to store and release electric power in the first and the second inductors (La, Lb) and shape the waveform of the input currents in line with the waveform of the input voltages of the first and second AC power supplies (AC1, AC2). Therefore, the PFC process maintains the lowest distortion of the currents input from the first and the second AC power supplies (AC1, AC2) and ensures the current and the voltage input from the same AC power supply have the same phase. Moreover, when the control unit (70) executes the PFC process, the first and the second AC switch units (10, 20) are controlled to be on or off so the AC to DC converting process will take effect. Accordingly, the AC to DC converting process and the PFC process can be combined together.

With further reference to FIGS. 3A and 3B, when the first embodiment of the multi-input power converter in accordance with the present invention is electrically connected to a first and a second DC power supplies (DC1, DC2) that each has a positive end and a negative end, the first and the second input terminals (T1, T2) are electrically connected respectively to the positive end of the first DC power supply (DC1) and the negative end of the second DC power supply (DC2), and the reference ground terminal (G) is electrically connected to the negative end of the first DC power supply (DC1) and the positive end of the second DC power supply (DC2). Furthermore, the DC to DC converting process may comprise steps of:

1. With reference to FIG. 3A, the control unit (70) controls the first switch (11) in the first AC switch unit (10) turning on to allow the current from the first DC power supply (DC1) to flow through the first inductor (La), the second and the third diodes (D2, D3) in the first AC switch unit (10) and the reference ground terminal (G) and back to the first DC power supply (DC1). Therefore, the first inductor (La) stores electric power output from the first DC power supply (DC1). In addition, the control unit (70) controls the second switch (21) in the second AC switch unit (20) turning on to allow the current flowing from the second DC power supply (DC2) to flow through the reference ground terminal (G), the eighth and the fifth diodes (D8, D5) in the second AC switch unit (20) and the second inductor (Lb) and back to the second DC power supply (DC2). Therefore, the second inductor (Lb) stores electric power output from the second DC power supply (DC2). Consequently, the first and the second inductors (La, Lb) store electric power independently.

2. With reference to FIG. 3B, the control unit (70) controls the first and the second switches (11, 21) in the first and the second AC switch units (10, 20) turning on to independently allow the first and the second inductors (La, Lb) to release stored electric power respectively to the first and the second storing devices (C1, C2). Therefore, the DC to DC converting function is performed. Consequently, the first and the second inductors (La, Lb) independently release stored electric power to the first and the second storing devices (C1, C2).

Figure 4:
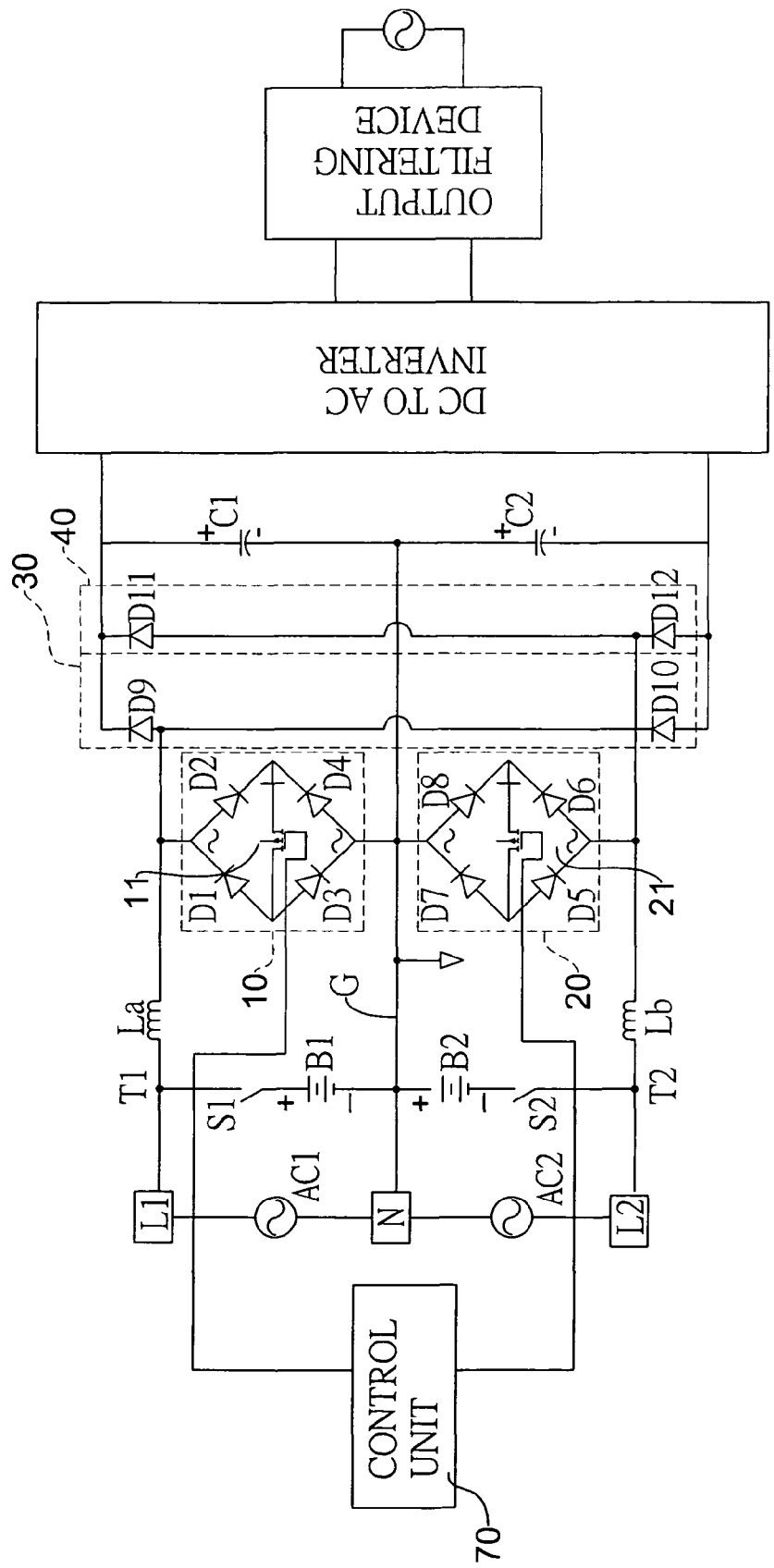
FIG. 4 is a functional block diagram of the multi-input power converter in FIG. 1 applied to a on-line uninterruptible power supply (UPS) that is electrically connected to a two-phase 3-wire split-phase AC power supply and comprises two batteries. two DC switches, a DC to AC inverter and an output filtering device.

With reference to FIG. 4, the first embodiment of the multi-input power converter in the present invention is applied to an on-line uninterruptible power supply (UPS) that is electrically connected to a two-phase 3-wire split-phase AC power supply and comprises two DC switches (S1, S2), two batteries (B1, B2), an DC to AC inverter and an output filtering device. The first and the second input terminals (T1, T2) in the present invention are electrically connected respectively to line wires (L1, L2) of a first AC power supply (AC1) and a second AC power supply (AC2) in the two-phase 3-wire split-phase AC power supply and are electrically connected respectively to the two batteries (B1, B2) respectively through the two DC switches (S1, S2). The reference ground terminal (G) is electrically connected to a neutral wire (N) of the two-phase 3-wire split-phase AC power supply and the two batteries (B1, B2). The positive terminal of the first storing device (C1) and the negative terminal of the second storing device (C2) are electrically connected to the DC to AC inverter. The output filtering device is electrically connected to the DC to AC inverter. In addition, the control unit (70) controls the first and the second AC switch units (10, 20) turning on or off based on the statuses of the first and the second AC power supplies (AC1, AC2) because the first and the second AC power supplies (AC1, AC2) are independent power supplies with a common neutral wire (N). When the first and the second AC power supplies (AC1, AC2) are available, the UPS controls the two DC switches (S1, S2) to be turned off so the AC to DC converting process as mentioned in FIGS. 2A to 2D and the PFC process will perform the AC to DC converting and PFC functions as in the conventional UPS. On the contrary, when the first and the second AC power supplies (AC1, AC2) fail, the UPS controls the two DC switches (S1, S2) to be turned on to supply DC electric power from the two batteries (B1, B2) so the DC to DC converting process as mentioned in FIGS. 3A and 3B will perform the DC to DC converting function as in the conventional UPS.

Figure 5B:
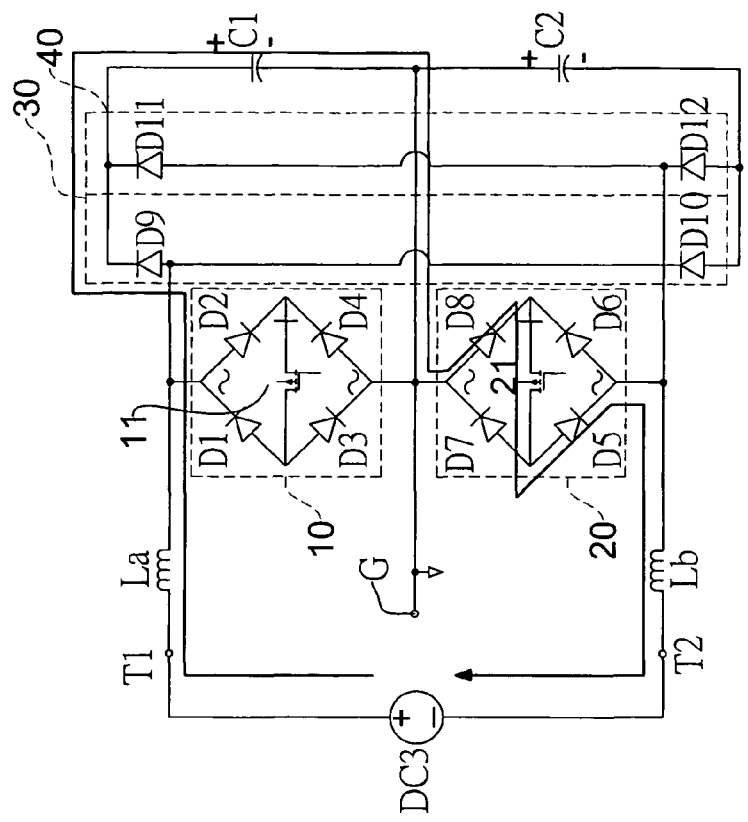
FIG. 5B is a circuit diagram of the multi-input power converter in FIG. 1 that shows the current routes when the multi-input power converter is electrically connected to a DC power supply and releases the DC electric power stored in the first and the second inductors to the first storing device.
Figure 5A:
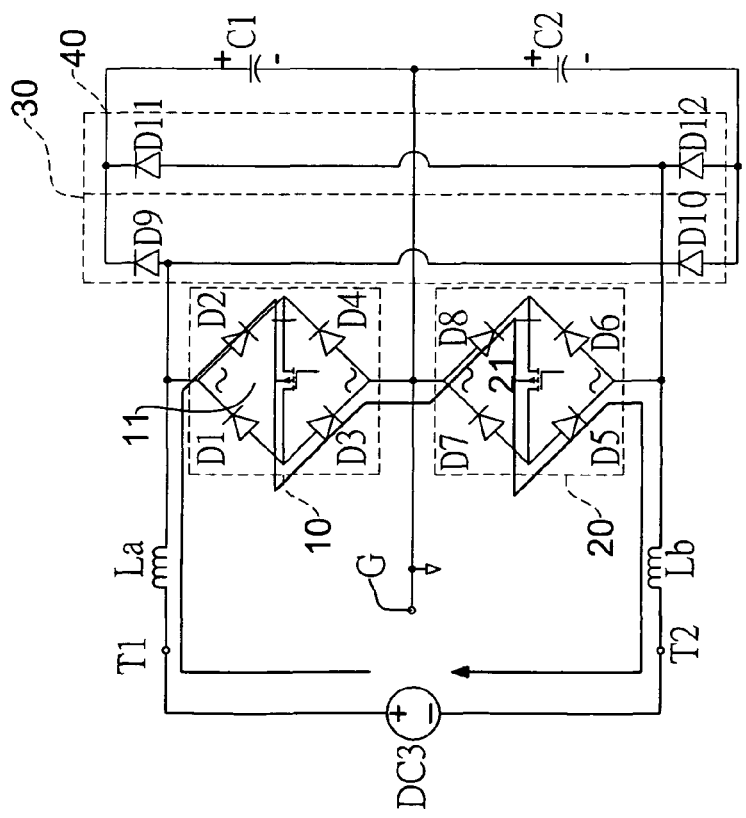
FIG. 5A is a circuit diagram of the multi-input power converter in FIG. 1 that shows the current routes when the multi-input power converter is electrically connected to a DC power supply and stores DC electric power in the first and the second inductors.
Figure 5C:
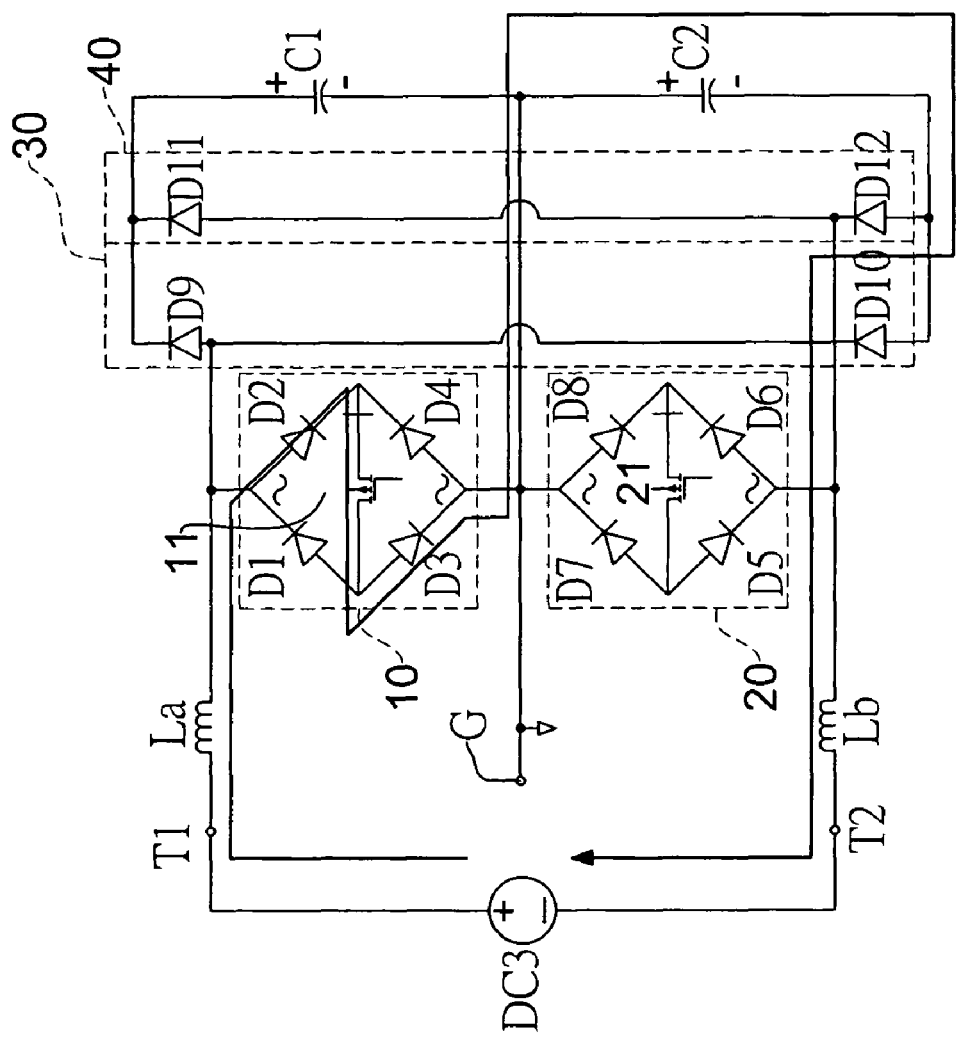
FIG. 5C is a circuit diagram of the multi-input power converter in FIG. 1 that shows the current routes when the multi-input power converter is electrically connected to a DC power supply and releases the DC electric power stored in the first and the second inductors to the second storing device.

In addition, with reference to FIGS. 5A to 5C, when the first embodiment of the multi-input power converter in accordance with the present invention is electrically connected to a single DC power supply (DC3) having a positive end and a negative end, the first and the second input terminals (T1, T2) are electrically connected respectively to the positive and negative ends of the DC power supply (DC3), and the reference ground terminal (G) is electrically connected to ground. Furthermore, the DC to DC converting process in this embodiment may comprise steps of:

1. With reference to FIG. 5A, the control unit (70) controls the first and the second switches (11, 21) in the first and the second AC switch units (10, 20) turning on together to allow the current outputting from the DC power supply (DC3) to flow through the first inductor (La), the second and the third diodes (D2, D3) in the first AC switch unit (10), the eighth and the fifth diodes (D8, D5) in the second AC switch unit (20) and the second inductor (Lb) and back to the DC power supply (DC3). Therefore, the first and the second inductors (La, Lb) store electric power output from the DC power supply (DC3) together.

2. With reference to FIG. 5B, the control unit (70) controls the first switch (11) in the first AC switch unit (10) turning off and the second switch (21) in the second AC switch unit (20) turning on to allow the first and the second inductors (La, Lb) to release stored electric power to the first storing device (C1). On the other hand, with further reference to FIG. 5C, the control unit (70) controls the first switch (11) in the first AC switch unit (10) turning on and the second switch (21) in the second AC switch unit (20) turning off to allow the first and the second inductors (La, Lb) to release stored electric power to the second storing capacitor (C2).

Figure 6:
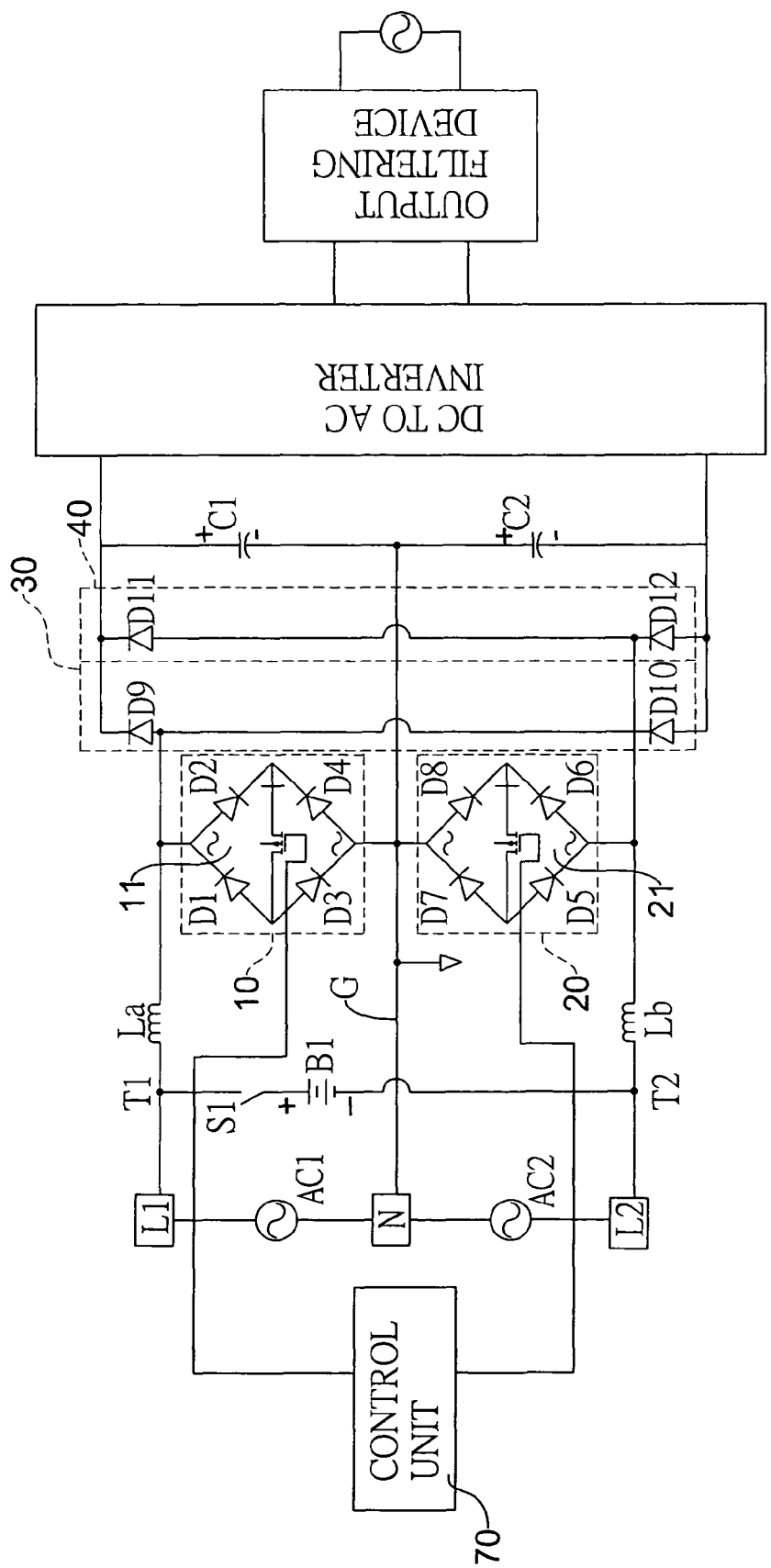
FIG. 6 is a functional block diagram of the multi-input power converter in FIG. 1 applied to an UPS that is electrically connected to a two-phase 3-wire split-phase AC power supply and further comprises a battery, a DC switch, a DC to AC inverter and an output filtering device.

With reference to FIG. 6, the first embodiment of the multi-input power converter in the present invention is applied to an on-line UPS that is electrically connected to a two-phase 3-wire split-phase AC power supply and comprises a DC switch (S1), a battery (B1), a DC to AC inverter and an output filtering device. The first and the second input terminals (T1, T2) are electrically connected respectively to line wires (L1, L2) of a first AC power supply (AC1) and a second AC power supply (AC2) in the two-phase 3-wire split-phase AC power supply, and the DC switch (S1) and the battery (B1) are electrically connected between the first and the second input terminals (T1, T2) in series. Therefore, when the first and the second AC power supplies (AC1, AC2) are available, the UPS controls the DC switch (S1) to be turned off so the AC to DC converting process as mentioned in FIGS. 2A to 2D and the PFC process will perform the AC to DC converting and PFC functions as in the conventional UPS. However, when the first and the second AC power supplies (AC1, AC2) fail, the UPS controls the DC switch (S1) to be turned on to supply DC electric power from the battery (B1) so the DC to DC converting process as mentioned in FIGS. 5A to 5C will perform the DC to DC converting function as in the conventional UPS.

Figure 7:
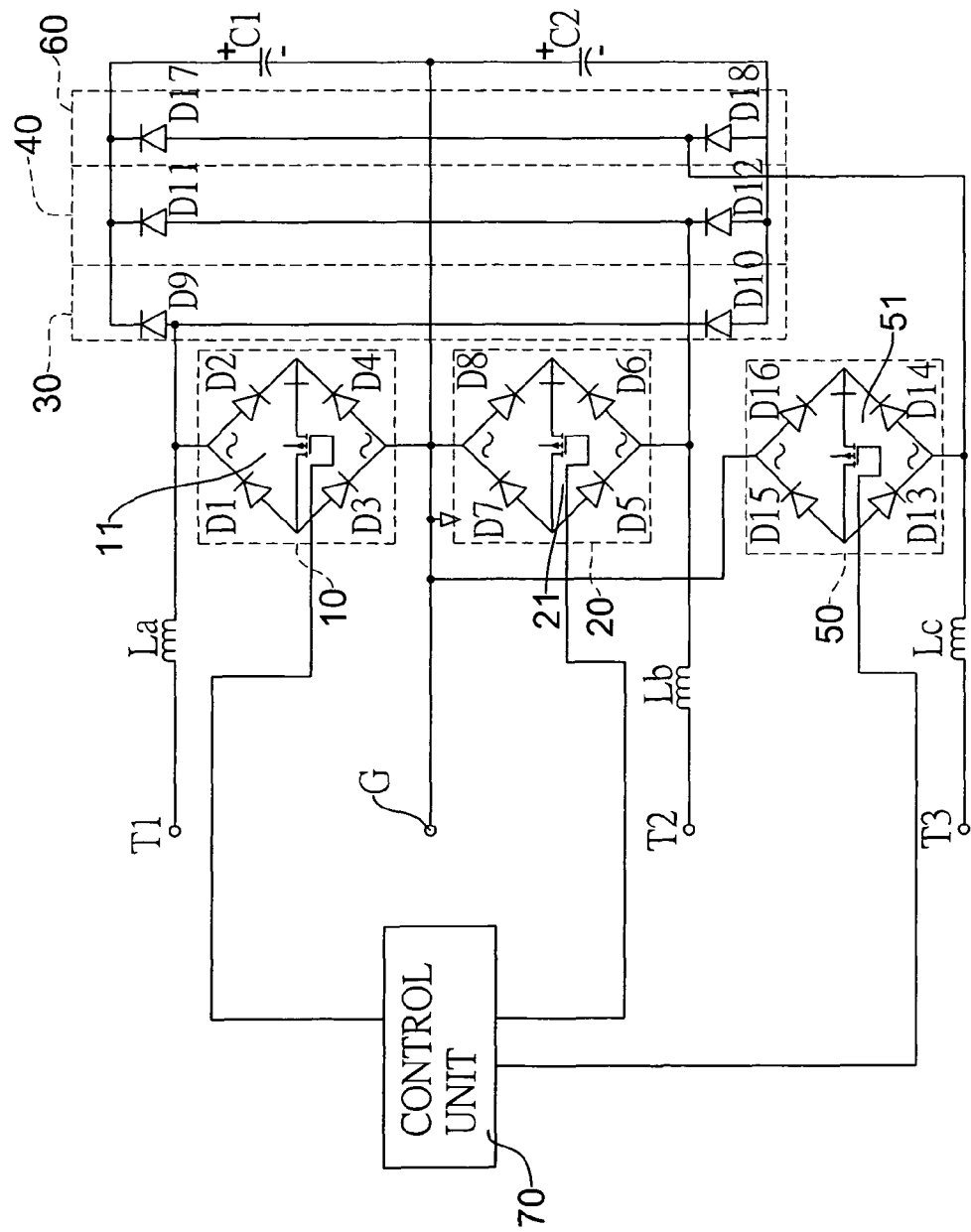
FIG. 7 is a circuit diagram of a second embodiment of a multi-input power converter in accordance with the present invention.

With reference to FIG. 7, a second embodiment of the multi-input power converter in the present invention further comprises a third input terminal (T3), a third inductor (Lc), a third AC switch unit (50) and a third rectifier (60) to allow the multi-input power converter in this embodiment to electrically connect to a three-phase 4-wire AC power supply.

The third inductor (Lc) has a first end and a second end. The first end of the third inductor (Lc) is electrically connected to the third input terminal (T3).

The third AC switch unit (50) has a first end and a second end and may comprise a third diode bridge circuit and a third switch (51). The first end of the third AC switch unit (50) is electrically connected to the second end of the third inductor (Lc). The second end of the third AC switch unit (50) is electrically connected to the reference ground terminal (G). The third diode bridge circuit comprises a thirteenth, a fourteenth, a fifteenth and a sixteenth diodes (D13, D14, D15, D16). Each diode (D13, D14, D15, D16) has two electrodes that form a cathode and an anode. The cathode of the thirteenth diode (D13) is electrically connected to the anode of the fourteenth diode (D14) at the first end of the third AC switch unit (50). The anode of the fifteenth diode (D15) is electrically connected to the anode of the thirteenth diode (D13) at a fifth node. The cathode of the sixteenth diode (D16) is electrically connected to the cathode of the fourteenth diode (D14) at a sixth node. The anode of the sixteenth diode (D16) is electrically connected to the cathode of the fifteenth diode (D115) at the second end of the third AC switch unit (50). The third switch (51) is electrically connected between the fifth node and the sixth node and may be a semiconductor switch.

The third rectifier (60) is electrically connected to the first end of the third AC switch unit (50), the second end of the third inductor (Lc) and the first and the second storing devices (C1, C2) and may comprise a seventeenth and a eighteenth diodes (D17, D18) electrically connected in series. Each diode (D17, D18) comprises two electrodes that form a cathode and an anode. The cathode of the seventeenth diode (D17) is electrically connected to the cathodes of the ninth and the eleventh diodes (D9, D11) and the positive terminal of the first storing device (C1). The anode of the eighteenth diode (D18) is electrically connected to the anodes of the tenth and the twelfth diodes (D10, D12) and the negative terminal of the second storing device (C2). The cathode of the eighteenth diode (D18) is electrically connected to the anode of the seventeenth diode (D17), the first end of the third AC switch unit (50) and the second end of the third inductor (Lc).

Figure 8:
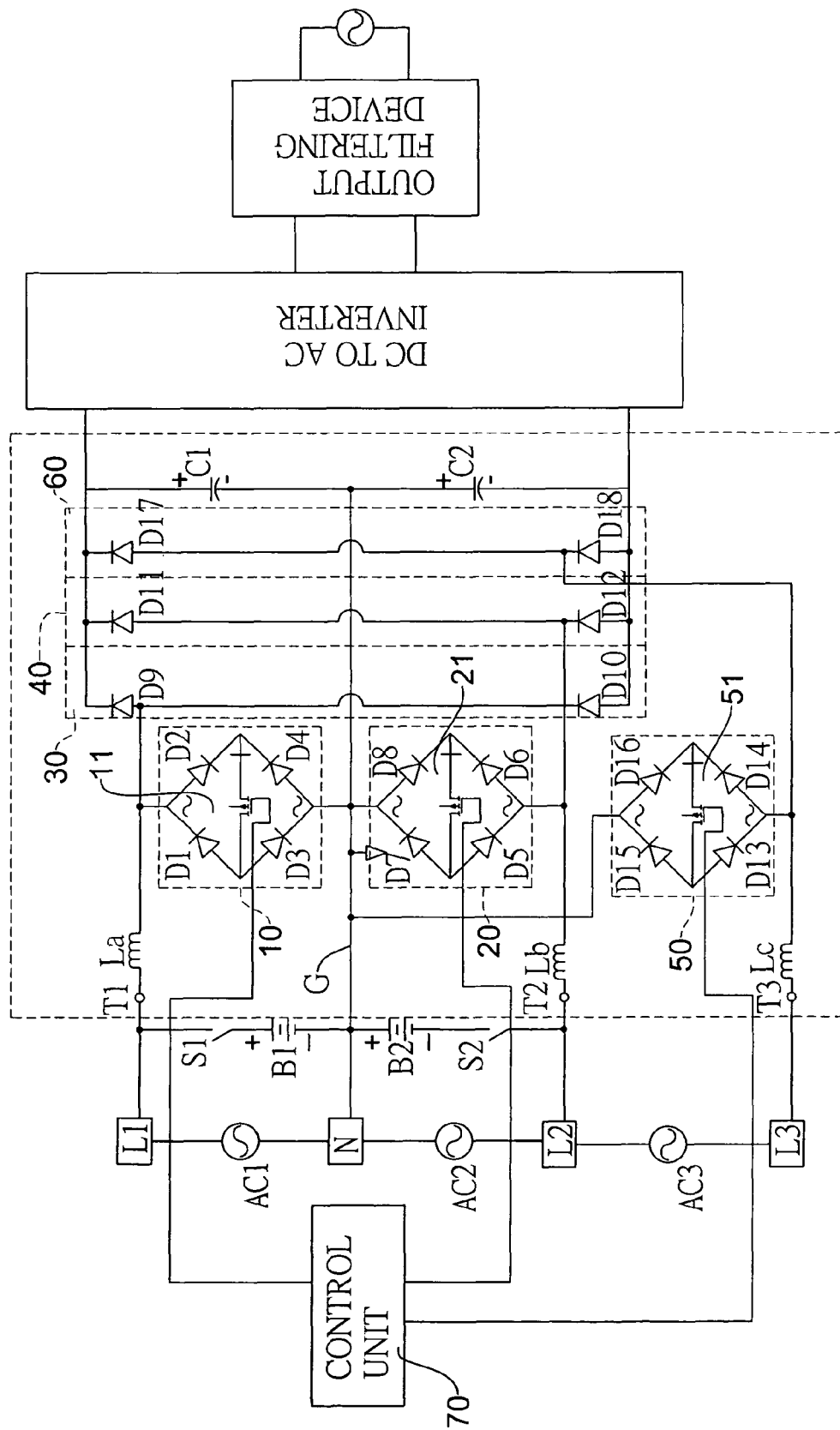
FIG. 8 is a functional block diagram of the multi-input power converter in FIG. 7 applied to an UPS that is electrically connected to a three-phase 4-wire AC power supply and comprises two batteries, two DC switches, a DC to AC inverter and an output filtering device.

With reference to FIG. 8, the second embodiment of the multi-input power converter in the present invention is applied to an on-line UPS that is electrically connected to a three-phase 4-wire AC power supply and comprises two DC switches (S1, S2), two batteries (B1, B2), a DC to AC inverter and an output filtering device. The first, the second and the third input terminals (T1, T2, T3) in the present invention are electrically connected respectively to line wires (L1, L2, L3) of a first AC power supply (AC1), a second AC power supply (AC2) and a third AC power supply (AC3) in the three-phase 4-wire AC power supply, and the first and the second input terminals (T1, T2) are electrically connected respectively to the two batteries (B1, B2) respectively through the two DC switches (S1, S2). The reference ground terminal (G) is electrically connected to a neutral wire (N) of the three-phase 4-wire AC power supply and the two batteries (B1, B2).

Once the first, the second and the third AC power supplies (AC1, AC2, AC3) are available, the UPS controls the two DC switches (S1, S2) to be turned off. The control unit (70) performs the AC to DC converting process and the PFC process that controls the first, the second and the third switches (11, 21, 51) in the first, the second and the third AC switch units (10, 20, 50) turning on and off independently. When any one of the first, the second and the third switches (11, 21, 51) is turned on, the inductor (La, Lb, Lc) electrically connected to the AC switch unit (10, 20, 50) having the turned on switch (11, 21, 51) stores electric power in positive and in negative half cycle. One the contrary, when any one of the first, the second and the third switches (11, 21, 51) is turned off, the inductor (La, Lb, Lc) electrically connected to the AC switch unit (10, 20, 50) having the turned off switch (11, 21, 51) releases stored electric power in positive and in negative half cycle respectively to the first and the second storing devices (C1, C2) electrically connected to the AC switch unit (10, 20, 50) having the turned off switch (11, 21, 51).

Furthermore, once the first, the second and the third AC power supplies (AC1, AC2, AC3) fail, the UPS controls the two DC switches (S1, S2) to be turned on. The control unit (70) performs the DC to DC converting process that controls the third switch (51) in the third AC switch unit (50) always turning off and controls the first and the second switches (11, 21) in the first and the second AC switch units (10, 20) turning on and off independently. When any one of the first and the second switches (11, 21) is turned on, the inductor (La, Lb) electrically connected to the AC switch unit (10, 20) having the turned on switch (11, 21) stores DC electric power. One the contrary, once any one of the first and the second switches (11, 21) in the first and the second AC switch units (10, 20) is turned off, the inductor (La, Lb) electrically connected to the AC switch unit (10, 20) having the turned off switch (11, 21) releases stored DC electric power to the storing device (C1, C2) electrically connected to the AC switch unit (10, 20) having the turned off switch (11, 21).

Figure 9:
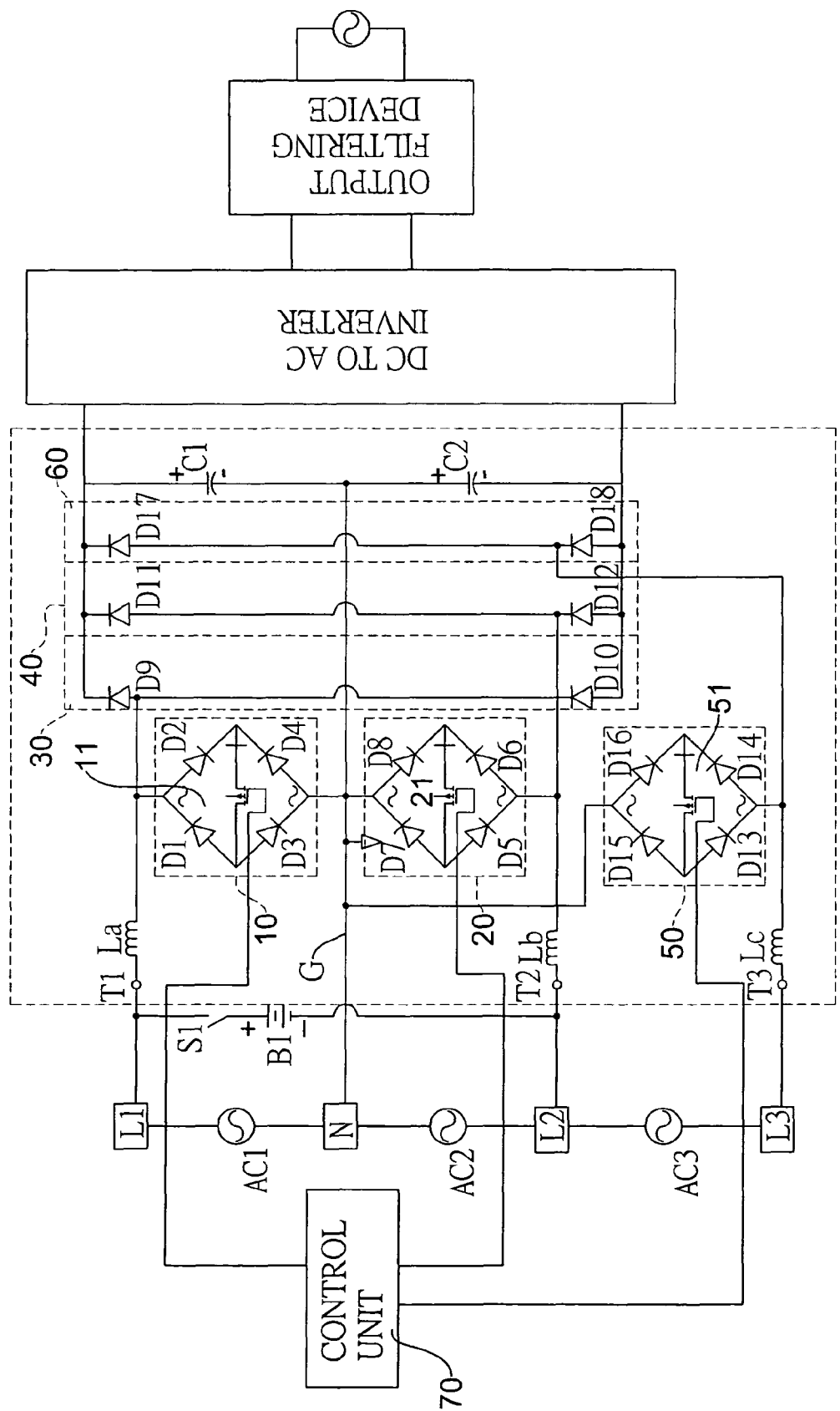
FIG. 9 is a functional block diagram of the multi-input power converter in FIG. 7 applied to an UPS that is electrically connected to a three-phase 4-wire AC power supply and further comprises a battery, a DC switch, a DC to AC inverter and an output filtering device.
Figure 10:
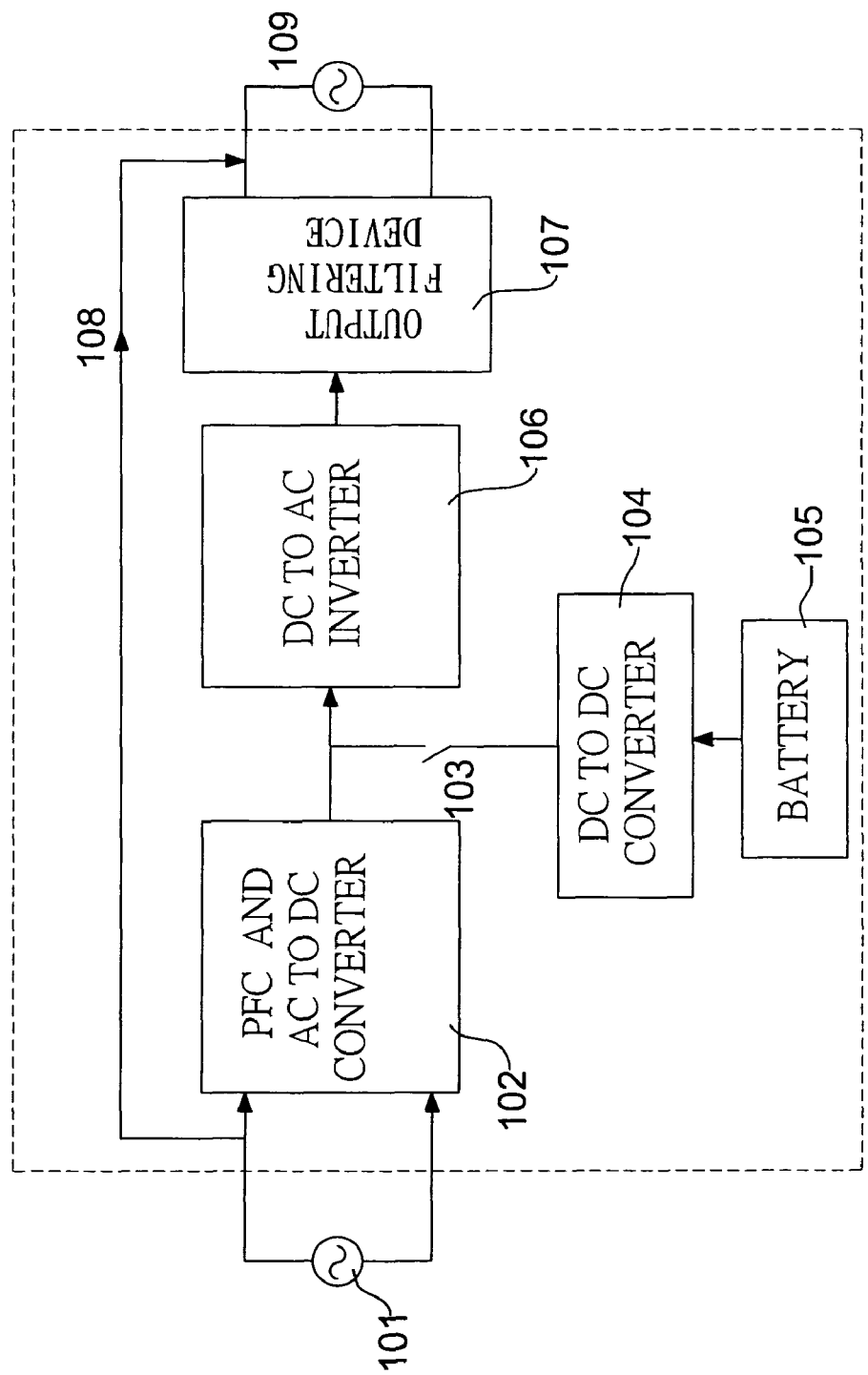
FIG. 10 is a functional block diagram of a conventional UPS.
Figure 11:
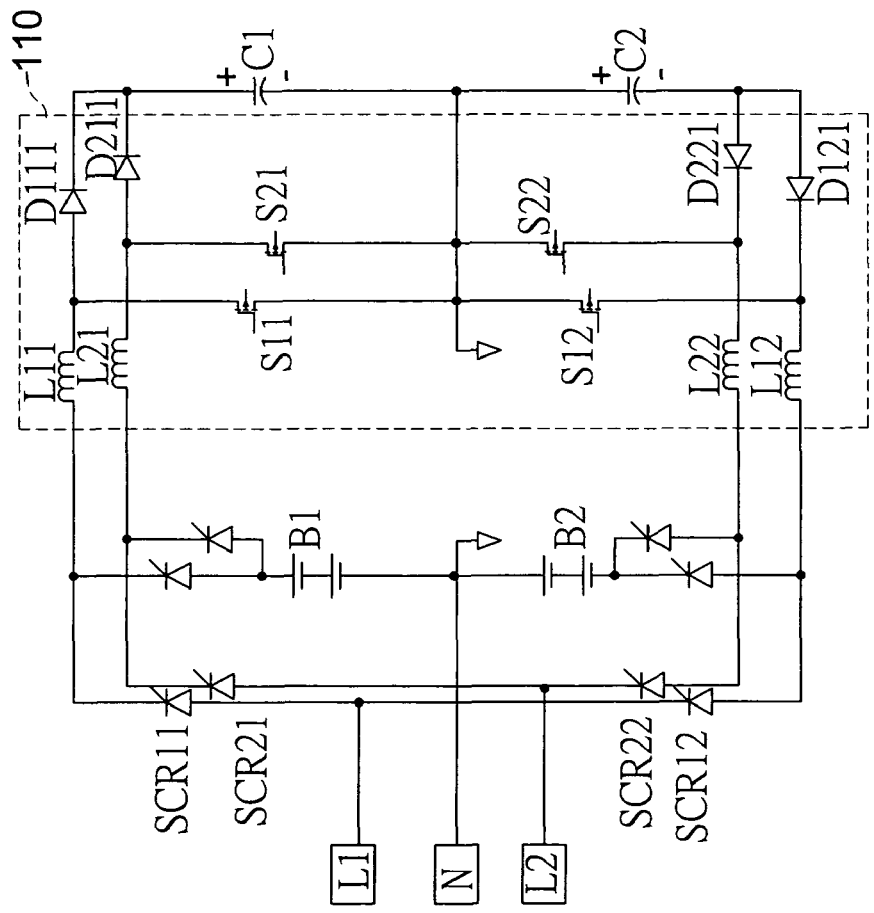
FIG. 11 is part of a circuit diagram of another two-phase 3-wire AC to DC and DC to DC converter.

With reference to FIG. 9, the second embodiment of the multi-input power converter in the present invention is applied to an on-line UPS that is electrically connected to a three-phase 4-wire AC power supply and comprises a DC switch (S1), a battery (B1), a DC to AC inverter and an output filtering device. The first, the second and the third input terminals (T1, T2, T3) in the present invention are electrically connected respectively to line wires (L1, L2, L3) of a first AC power supply (AC1), a second AC power supply (AC2) and a third AC power supply (AC3) in the three-phase 4-wire AC power supply. The DC switch (S1) and the battery (B1) are electrically connected between the first and the second input terminals (T1, T2) in series. The reference ground terminal (G) is electrically connected to ground.

Once the first, the second and the third AC power supplies (AC1, AC2, AC3) are available, the UPS controls the two DC switches (S1, S2) to be turned off and the control unit (70) performs the same AC to DC converting process and the PFC process as when the second embodiment of the multi-input power converter in the present invention is applied to the on-line UPS electrically connected to a three-phase 4-wire AC power supply and comprising two DC switches (S1, S2) and two batteries (B1, B2).

Furthermore, once the first, the second and the third AC power supplies (AC1, AC2, AC3) fail, the UPS controls the DC switch (S1) to be turned on. The control unit (70) performs the DC to DC converting process that controls the third switch (51) in the third AC switch unit (50) always turning off and controls the first and the second switches (11, 21) in the first and the second AC switch units (10, 20) turning on together and turning off alternately. When the first and the second switches (11, 21) in the first and the second AC switch units (10, 20) are both turned on, the first and the second inductors (La, Lb) store the DC electric power. When any one of the first and the second switches (11, 21) is turned off, the first and the second inductors (La, Lb) release stored DC electric power to the storing device (C1, C2) electrically connected to the AC switch unit (10, 20) having the turned off switch (11, 21).

Based on the foregoing description, the present invention requires less electric elements than the AC to DC converting and PFC device and the DC to DC converting device in the conventional UPS to provide the PFC, the AC to DC converting and the DC to DC converting functions by controlling the switches (11, 21, 51) in the AC switch units (10, 20, 50) turning on and off and using the diodes in the in the AC switch units (10, 20, 50) to change the routes of the currents flowing in the multi-input power converter. Therefore, the present invention can reduce the cost of designing circuit of the UPS.

Even though numerous characteristics and advantages of the present invention have been set forth in the foregoing description, together with details of the structure and function of the invention, the disclosure is illustrative only. Changes may be made in detail, especially in matters of arrangement of parts within the principles of the invention to the full extent indicated by the broad general meaning of the terms in which the appended claims are expressed.

What is claimed is:

1. A multi-input power converter, comprising:
    input connection means having a first input terminal, a second input terminal and a reference ground terminal for electrically connecting to and receiving input currents from an input power system;
    inductor means having a first inductor and a second inductor electrically connected to the first and second input terminals of the input connection means for charging and discharging the input currents;
    switch means having a first AC switch unit and a second AC switch unit electrically connected to the inductor means for conducting the input currents;
    rectifier means having
        a first rectifier comprising
            a ninth diode having a cathode and an anode, and the anode connected to the first inductor and the first AC switch unit; and
            a tenth diode having a cathode connected to the anode of the ninth diode and having an anode; and
        a second rectifier comprising
            an eleventh diode having a cathode connected to the cathode of the ninth diode and having an anode; and
            a twelfth diode having a cathode connected to the anode of the eleventh diode, the second inductor and the second AC switch unit and having an anode connected to the anode of the tenth diode;
    output storing means having a first storing device and a second storing device electrically connected to the rectifier means for receiving the rectified inductor currents and charging voltages when the inductor means is discharged, wherein
        the first storing device is connected between the cathode of the ninth diode and the reference ground; and
        the second storing device is connected between the reference ground and the anode of the tenth diode; and
    switch control means having a control unit electrically connected to the first and the second AC switch units of the switch means to control the inductor means charging the input currents and discharging input currents to the output storing means by controlling the first and the second AC switch units turning on and turning off.

2. The multi-input power converter as claimed in claim 1, wherein:
    the input power system comprises two independent DC power supplies; and
    the control unit further has a DC to DC converting process comprising steps of:
    a) controlling the AC switch units turning on independently to charge the input currents to one of the first inductor and the second inductor that is electrically connected to the turned on AC switch unit; and
    b) controlling the AC switch units turning off independently to discharge the input currents stored in the first and the second inductors to at least one of the first and the second storing devices.

3. The multi-input power converter as claimed in claim 1, wherein:
    the input power system comprises a DC power supply,
    the first and the second input terminals are electrically connected to the DC power supply; and
    the control unit further has a DC to DC converting process comprising steps of:
    a) controlling the AC switch units turning on together to charge the input currents into the first and the second inductors; and
    b) controlling the AC switch units turning off independently to discharge the input currents stored in the first and the second inductors to the storing device that is electrically connected to the turned on AC switch unit.

4. The multi-input power converter as claimed in claim 1, wherein:
    the input power system comprises a first and a second AC power supplies;
    the first and the second input terminals are electrically connected respectively to line wires of the first and the second AC power supplies;
    the reference ground terminal is electrically connected to a common neutral wire of the first and the second AC power supplies; and
    the control unit further has a power factor correction and AC to DC converting process comprising steps of:
    a) controlling the first AC switch unit turning on and off based on input voltages of the first AC power supply to charge the input currents into the first inductor, to discharge the input currents stored in the first inductor to the first storing device and to shape the input currents waveform similar to the input voltages waveform of the first AC power supply, and b) controlling the second AC switch unit turning on and off based on input voltages of the second AC power supply to charge the input currents into the second inductor, to discharge the input currents stored in the second inductor to the second storing device and to shape the input currents waveform similar to the input voltages waveform of the second AC power supply.

5. The multi-input power converter as claimed in claim 4, wherein the first and the second AC power supplies are chosen respectively from a three-phase AC power supply.

6. An uninterruptible power supply (UPS) having a multi-input power converter as claimed in claim 1 comprising:

two batteries electrically connected together at the reference ground terminal and electrically connected respectively to the first and the second input terminals;

two DC switches electrically connected respectively between the two batteries and the first and the second input terminals to selectively provide DC electric power to the multi-input power converter;

a DC to AC converter electrically connected to the first and the second storing devices to convert the electric power stored in the first and the second storing devices into an AC output power; and an output filtering device electrically connected to the DC to AC converter to filter the AC output power.

7. The UPS as claimed in claim 6, wherein the control unit in the multi-input power converter further has a DC to DC converting process executed when at least one of the DC switches are turned on and comprising steps of:

a) controlling the AC switch unit corresponding to the turned on DC switch turning on to store input currents into the inductor corresponding to the turned on DC switch; and b) controlling the AC switch unit corresponding to the turned on DC switch turning off to discharge the input currents stored in the inductor corresponding to the turned on DC switch to at least one of the first and the second storing devices.

8. The UPS as claimed in claim 7, wherein:

the input power system comprises a first and a second AC power supplies;

the first and the second input terminals are electrically connected respectively to line wires of a first and a second AC power supplies;

the reference ground terminal is electrically connected to a common neutral wire of the first and the second AC power supplies; and the control unit further has a power factor correction and AC to DC converting process executed when the DC switches are turned off and comprising steps of:

a) controlling the first AC switch unit turning on and off based on input voltages of the first AC power supply to charge the input currents into the first inductor, to discharge the input currents stored in the first inductor to the first storing device and to shape the input currents waveform similar to the input voltages waveform of the first AC power supply, and b) controlling the second AC switch unit turning on and off based on input voltages of the second AC power supply to charge the input currents into the second inductor, to discharge the input currents stored in the second inductor to the second storing device and to shape the input currents waveform similar to the input voltages waveform of the second AC power supply.

9. An UPS having a multi-input power converter as claimed in claim 1 comprising:

a battery and a DC switch electrically connected in series and electrically connected respectively to the second and the first input terminals;

a DC to AC converter electrically connected to the first and the second storing devices to convert the electric power stored in the first and second string devices into an AC output power; and an output filtering device connected to the DC to AC converter to filter the AC output power.

10. The UPS as claimed in claim 9, wherein the control unit further has a DC to DC converting process executed when the DC switch is turned on and comprising steps of:

a) controlling the AC switch units turning on together to charge the input currents into the first and the second inductors; and b) controlling the AC switch units turning off independently to discharge the input currents stored in the first and the second inductors to the storing device that is electrically connected to the turned on AC switch unit.

11. The UPS as claimed in claim 9, wherein:

the input power system comprises a first and a second AC power supplies;

the first and the second input terminals are electrically connected respectively to line wires of a first and a second AC power supplies;

the reference ground terminal is electrically connected to a common neutral wire of the first and the second AC power supplies; and the control unit further has a power factor correction and AC to DC converting process executed when the DC switch is turned off and comprising steps of:

a) controlling the first AC switch unit turning on and off based on input voltages of the first AC power supply to charge the input currents into the first inductor, to discharge the input currents stored in the first inductor to the first storing device and to shape the input currents waveform similar to the input voltages waveform of the first AC power supply, and b) controlling the second AC switch unit turning on and off based on input voltages of the second AC power supply to charge the input currents into the second inductor, to discharge the input currents stored in the second inductor to the second storing device and to shape the input currents waveform similar to the input voltages waveform of the second AC power supply.

\* \* \* \* \*